INVENTOR:
JOSEPH FOLK

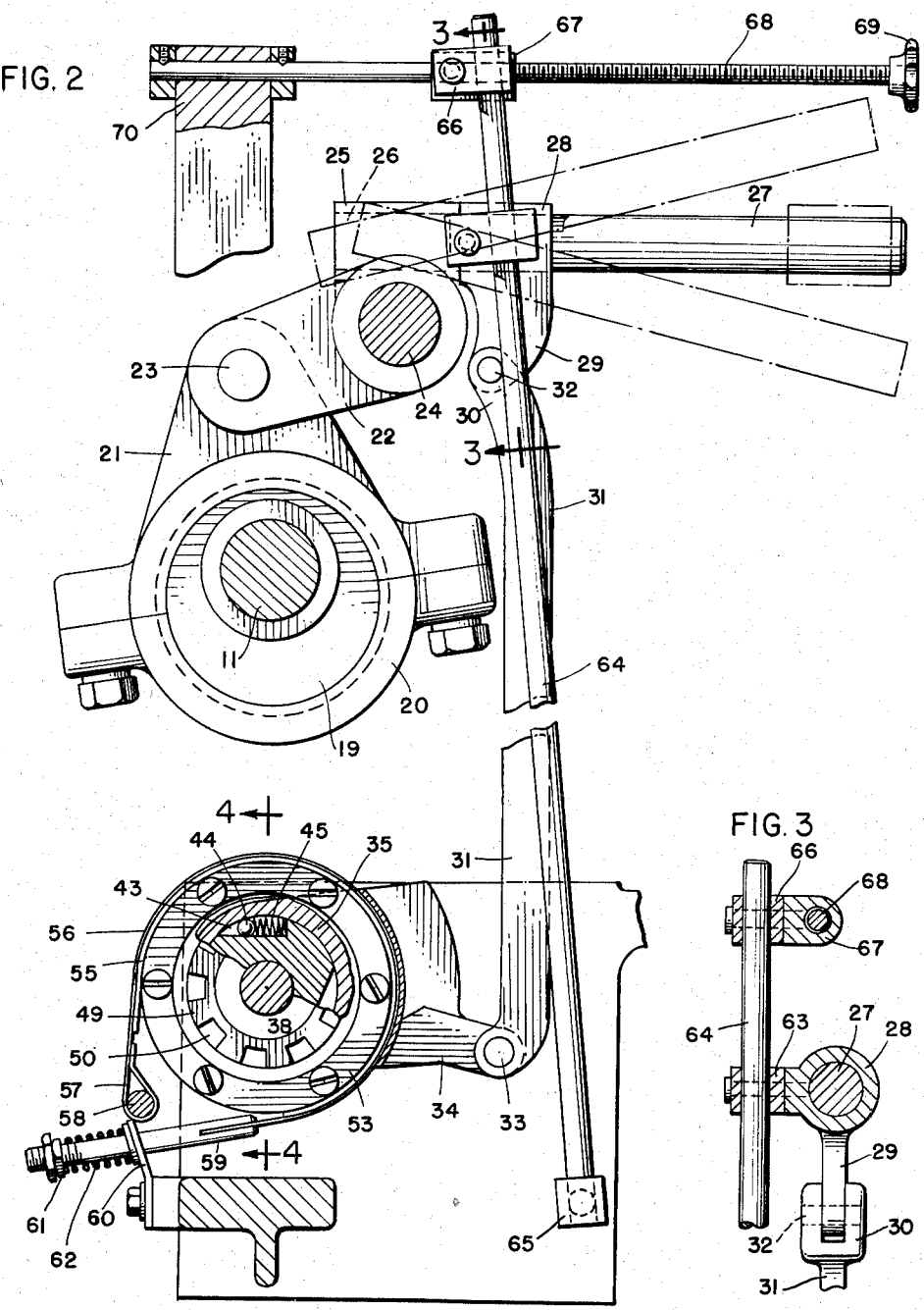
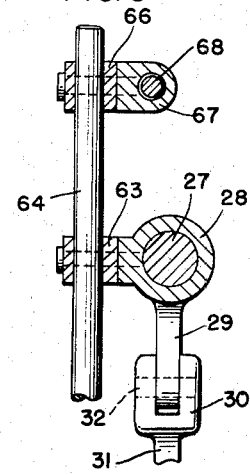

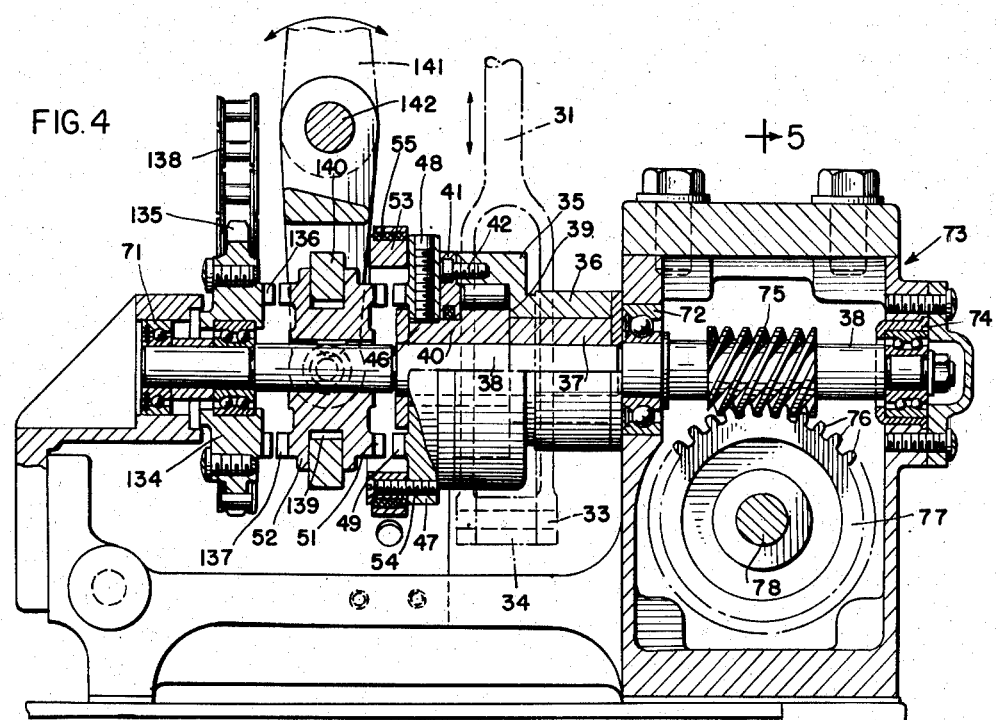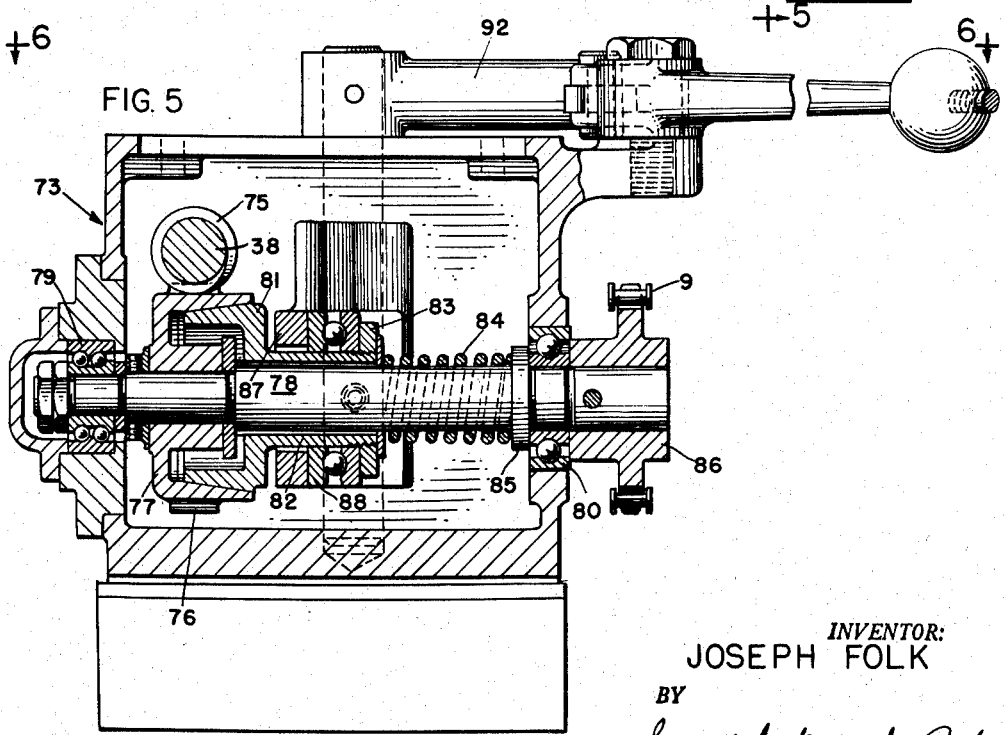

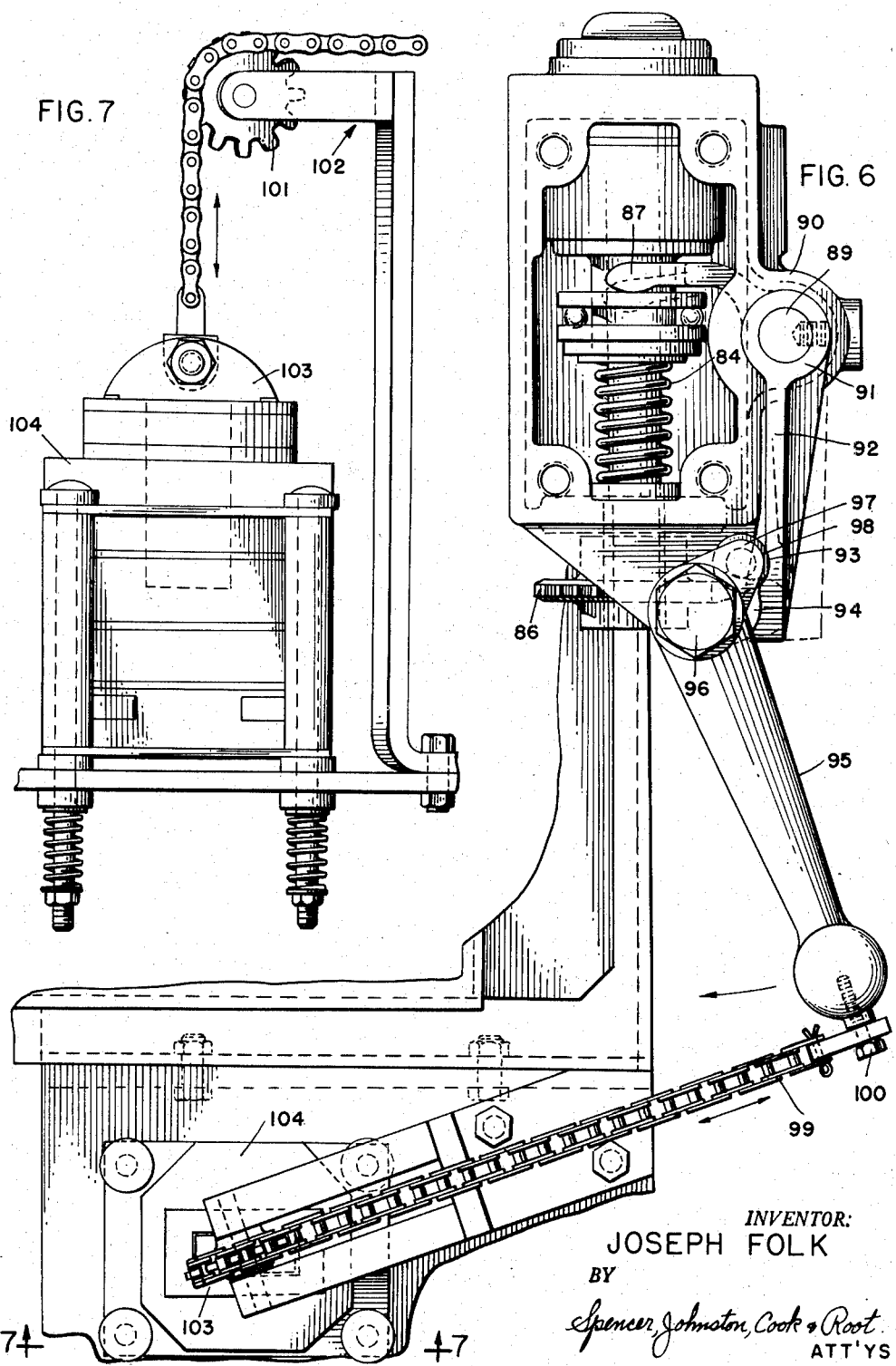

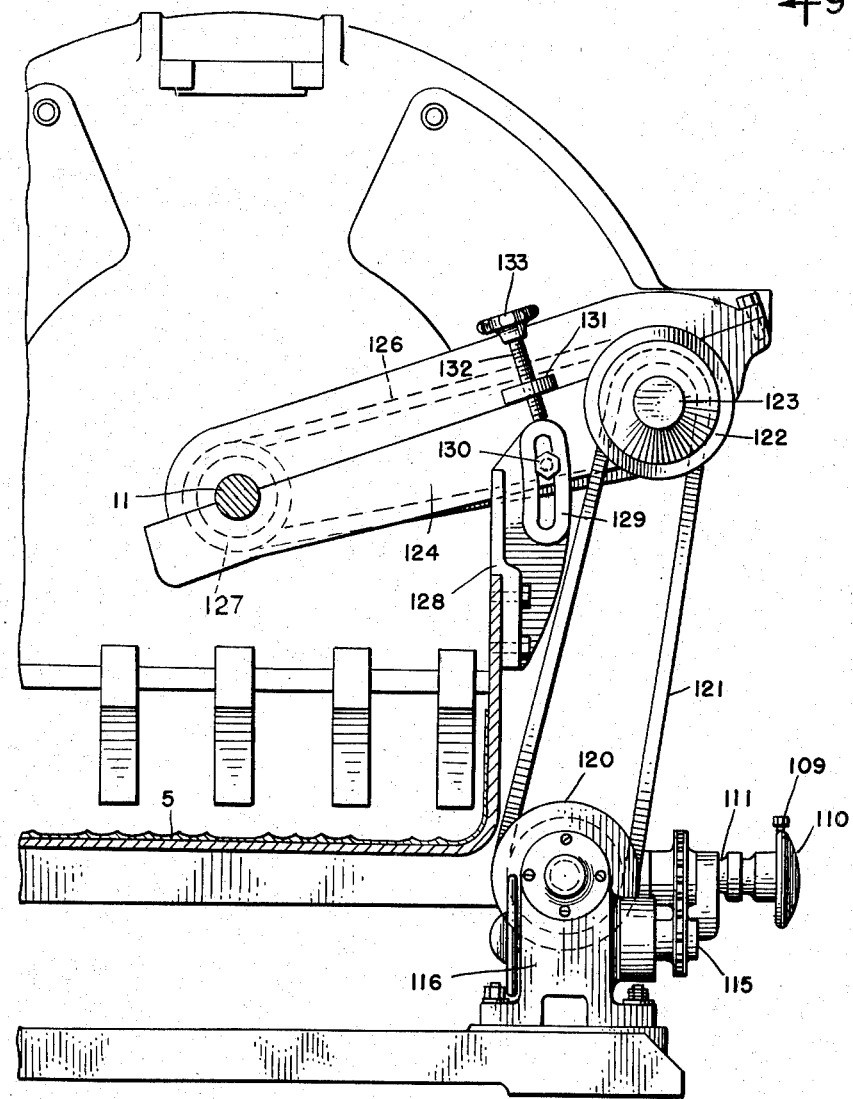

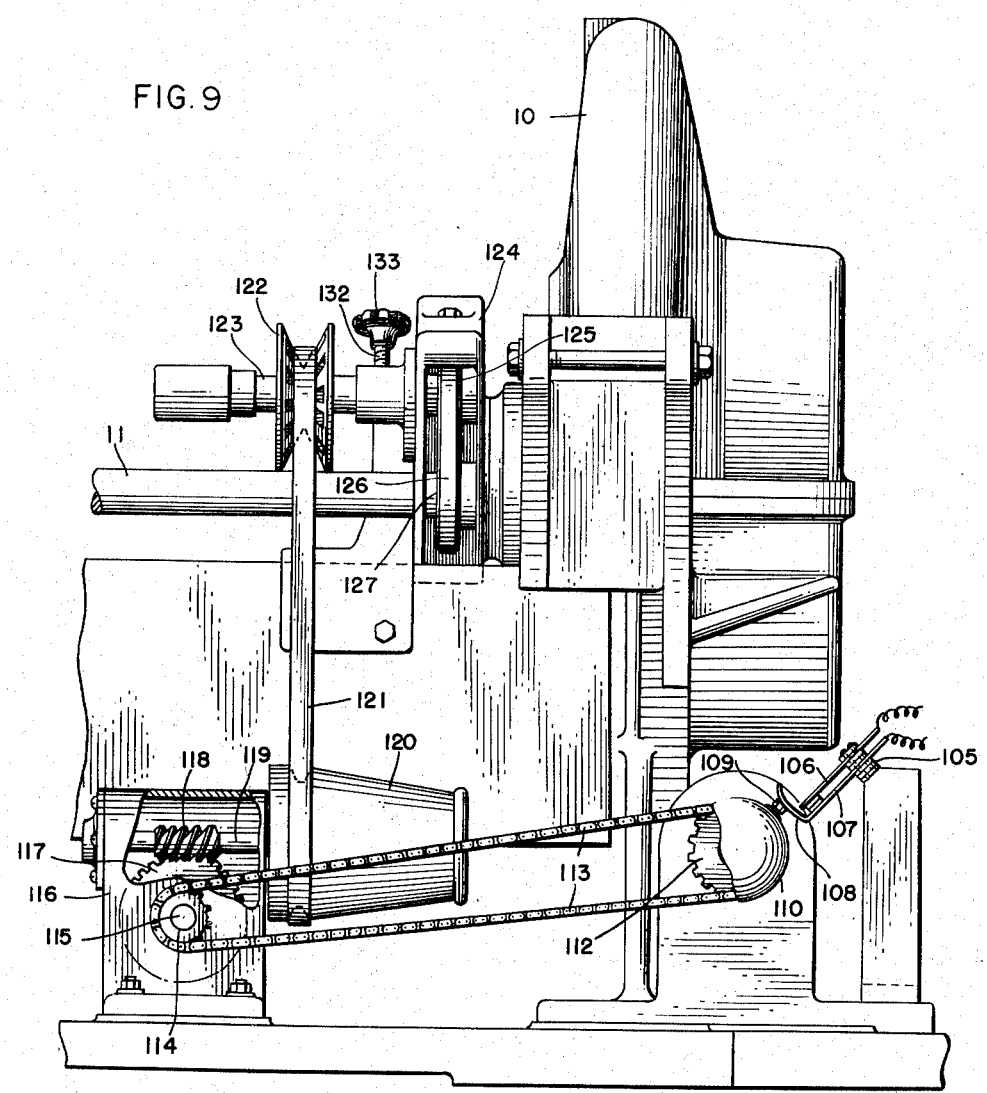

Jan. 27, 1959
J. FOLK
2,870,810
AUTOMATIC SHINGLING OR STACKING
DEVICE FOR A SLICING MACHINE
Original Filed April 23, 1952
9 Sheets-Sheet 7
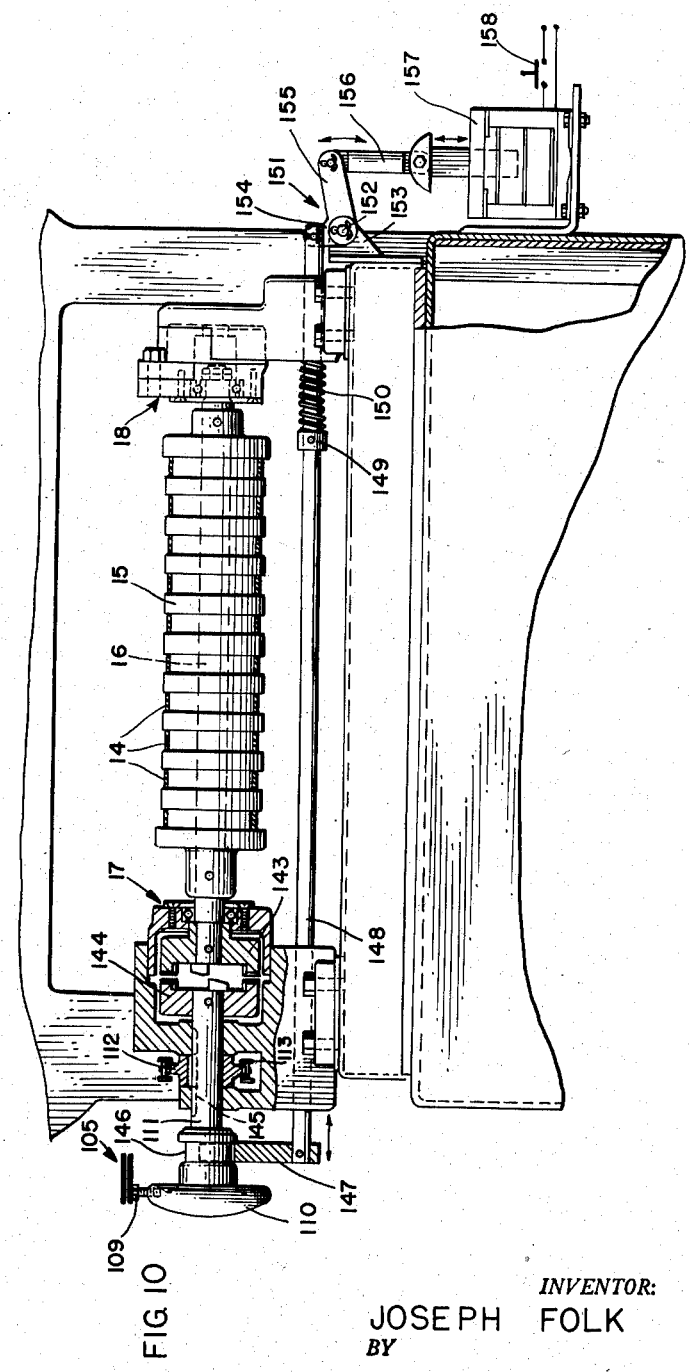
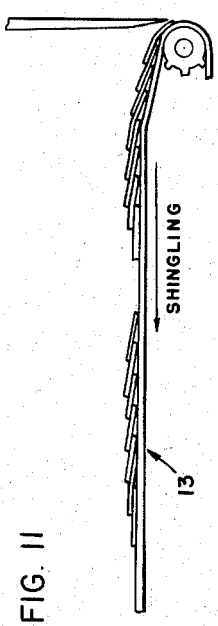
INVENTOR:
JOSEPH FOLK
BY
Spencer Johnston, Cook & Root.
ATT'YS

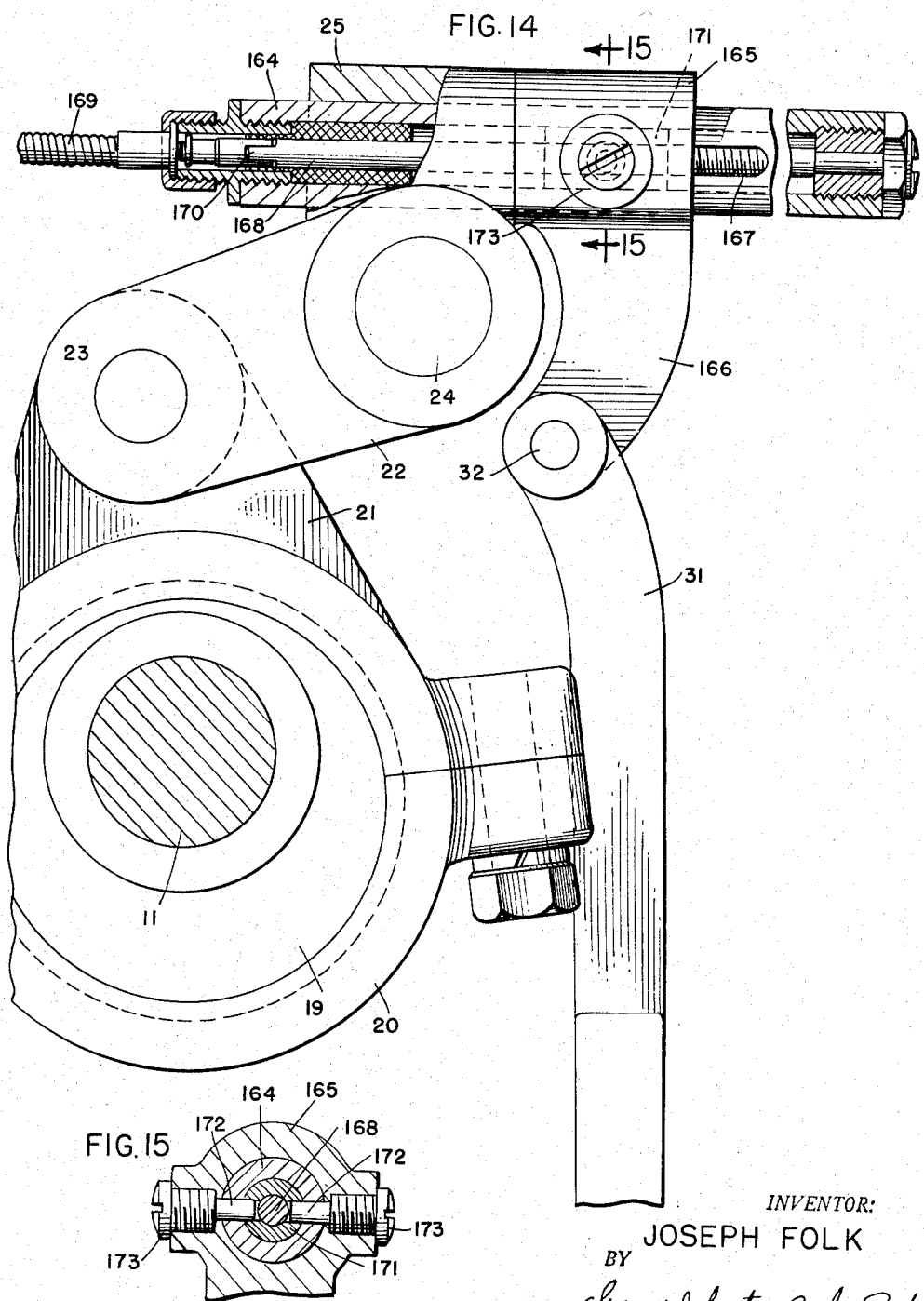

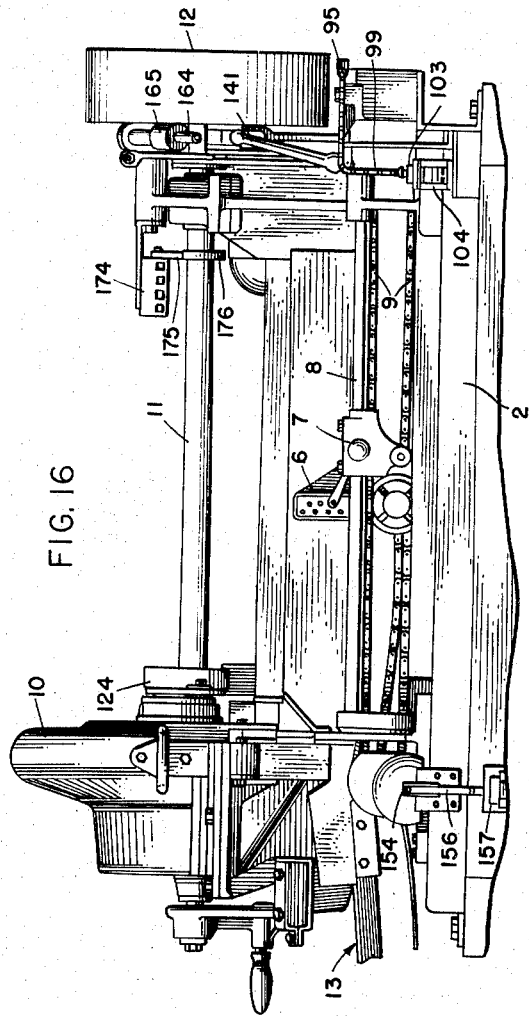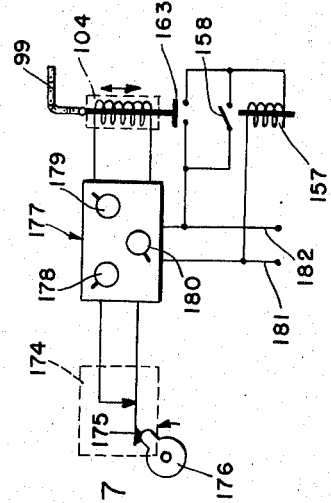
INVENTOR:
JOSEPH FOLK

United States Patent Office 2,870,810
Patented Jan. 27, 1959

2,870,810

AUTOMATIC SHINGLING OR STACKING DEVICE FOR A SLICING MACHINE

Joseph Folk, La Porte, Ind., assignor to U. S. Slicing Machine Company, Inc., La Porte, Ind., a corporation of Indiana Continuation of application Serial No. 283,804, April 23, 1952. This application February 9, 1955, Serial No. 487,088

16 Claims. (Cl. 146—94)

This application is a continuation of my copending application Serial No. 283,804, filed April 23, 1952, now abandoned, and assigned to the present assignee. My copending application Serial No. 283,804, filed April 23, 1952, is made a part hereof and the disclosure of said application is incorporated herein by reference as fully as if it were set forth herein in its entirety.

This invention relates in general to improvements in slicing machines and is directed particularly to an improved machine for automatically shingling or stacking groups of slices of a substance at predetermined intervals and for controlling the number of slices in each group. My earlier filed copending application Serial No. 226,809, filed May 17, 1951, now Patent No. 2,744,553, is directed primarily to an attachment for existing slicing machines for automatically controlling the grouping of slices of a substance in shingled fashion, whereas the present invention is directed to the machine as a whole and embodies automatic control means for both shingling and stacking a predetermined number of slices in groups.

While the slicing machine embodying the present invention may have general application for the purpose of slicing various substances, its primary purpose is for use in slicing bacon and will be so described herein for purposes of illustration. It will also be evident, however, that the machine is not limited to slicing bacon but may be used for slicing different kinds of meat as well as other substances without in any way departing from the spirit of the invention.

It is customary practice at the present time, particularly in the meat industry, to package sliced meat in individual packages of predetermined weights such as, for example, one-half pound, one pound, and the like. At the present time slicing machines which have automatic means associated therewith for continuously feeding the substance into the slicing knife make no provision for dividing the slices into groups containing a predetermined number of slices for a package of a given weight.

Large slicing machines for bacon wherein a side of bacon is advanced either continuously or intermittently toward the knife are customarily provided with means for regulating the rate of speed of the substance pusher so that the slices severed from the substance will be of a predetermined thickness. An initial determination is made that a certain number of slices of a certain thickness will have a predetermined weight. The slices are then severed from the body of the substance in accordance with the predetermined thickness and drop onto a continuously moving conveyor which automatically shingles the slices. Beyond this first conveyor there is usually located a second conveyor to which the shingled slices are transferred and which has a number of weighing scales associated therewith on each side. Several operators are required to remove from the conveyor a certain number of slices which are supposed to have a predetermined weight. The operators usually have available some part of slices which may be added to the group of slices if the original group removed has insufficient weight.

The feeding mechanism for the substance pusher may have its speed increased or decreased depending upon the thickness of the slices desired. The knife operates continuously at a given rate of speed so that the faster the substance is moved toward the knife, the greater will be the thickness of the slices. A control may be provided to start and stop the feeding of the pusher, but up to the present time this control has been manual and is used primarily for starting and stopping the feed at the beginning and end of a given operation. In order to group the slices so that each group contains a predetermined number of slices, it would be necessary for an operator to be in attendance constantly and mentally retain the number of slices cut and manually stop the feed at predetermined intervals.

While it is customary to overlap, or shingle, bacon slices for packaging, it is likewise customary for other types of meat to stack the slices for packaging. When the substance slices are shingled, the receiving conveyor will move continously. When, however, the substance slices are to be stacked, then the receiving conveyor will move only intermittently. For example, when the receiving conveyor is stationary and the substance is being advanced to the knife the slices severed therefrom will fall onto the conveyor at the same location and will be stacked. When a predetermined number of slices, or weight of a substance, has been stacked, then the conveyor will be advanced a short distance while the feeding of the substance is stopped in order to provide a space between the stacks. It will be evident that to control a machine manually for accomplishing either the shingling or stacking of slices would be a most difficult job for an operator and it is, therefore, one of the principal objects of the present invention to accomplish the foregoing results completely automatically.

Another object of the invention is to provide a slicing machine with control means which may be manually set for either shingling or stacking slices severed from a substance advanced to the slicing knife.

A further object of the invention is to provide manually operable means for controlling the operation of a slicing machine so that the machine will either shingle or stack slices severed from a substance and will thereafter automatically group the slices in spaced relation so that each group will retain a predetermined number of slices.

Still another object of the invention is to provide a slicing machine with an automatically controlled mechanism for interrupting the operation of the substance advancing means at predetermined intervals for the purpose of grouping the slices and to provide, further, an adjusting device for regulating time intervals between the interruptions.

A still further object of the invention is to provide in a slicing machine a control mechanism for automatically determining the thickness of slices to be severed from a substance and to group those slices in groups of a predetermined weight.

Still another object of the invention is to provide novel electrical means capable of being manually set in advance for automatically counting the number of slices in a given group and thereafter to cause the interruption of the substance feeding mechanism for spacing the resulting groups of slices.

Still another object of the invention is to provide in a slicing machine a novel mechanism for stacking slices severed from a substance wherein interruption of the advancement of the substance toward the knife and movement of the normally stationary receiving conveyor may be accomplished simultaneously thereby to provide a space between adjacent stacks.

Other objects and advantages of the invention will become apparent upon reading the following description taken in conjunction with the accompanying drawings in which:

Fig. 2 is a fragmentary enlarged vertical sectional view of the operating means for the pusher taken substantially along the plane of line 2—2 in Fig. 1;

Fig. 3 is a fragmentary sectional view of a detail of the feed operating means taken along the plane of line 3—3 of Fig. 2;

Fig. 4 is a vertical sectional view taken along the plane of line 4—4 of Fig. 2;

Fig. 5 is a vertical sectional view taken along the plane of line 5—5 of Fig. 4;

Fig. 6 is a plan view of the operating means for the substance pusher with a portion thereof removed to show internal details and taken along the plane of line 6—6 of Fig. 5;

Fig. 7 is an elevational view of the solenoid which operates the feed clutch for the substance pusher taken along the plane of line 7—7 of Fig. 6;

Fig. 8 is an enlarged fragmentary view partly in section and partly in elevation and taken along the plane of line 8—8 of Fig. 1;

Fig. 9 is an elevational view of the mechanism shown in Fig. 8 and is taken along the plane of line 9—9 of Fig. 8;

Fig. 10 is an enlarged fragmentary vertical sectional view taken along the plane of line 10—10 of Fig. 1;

Fig. 11 is a somewhat diagrammatic elevational view illustrating the shingling of slices in spaced groups;

Fig. 12 is a somewhat diagrammatic elevational view illustrating stacked slices in spaced groups;

Fig. 13 is a simplified wiring diagram of the form of the invention illustrated in Figs. 1 to 10, inclusive;

Fig. 14 is a further enlarged view similar to Fig. 2 but illustrating a modified form of the adjusting means for regulating the thickness of slices;

Fig. 15 is a fragmentary vertical sectional view taken along the plane of line 15—15 of Fig. 14;

Fig. 16 is a view similar to Fig. 1 but showing a modified form of the invention for electrically controlling the operation of the machine instead of the mechanical means of Fig. 1; and Fig. 17 is a wiring diagram showing the more important elements of the electrical control means.

Figure 1:
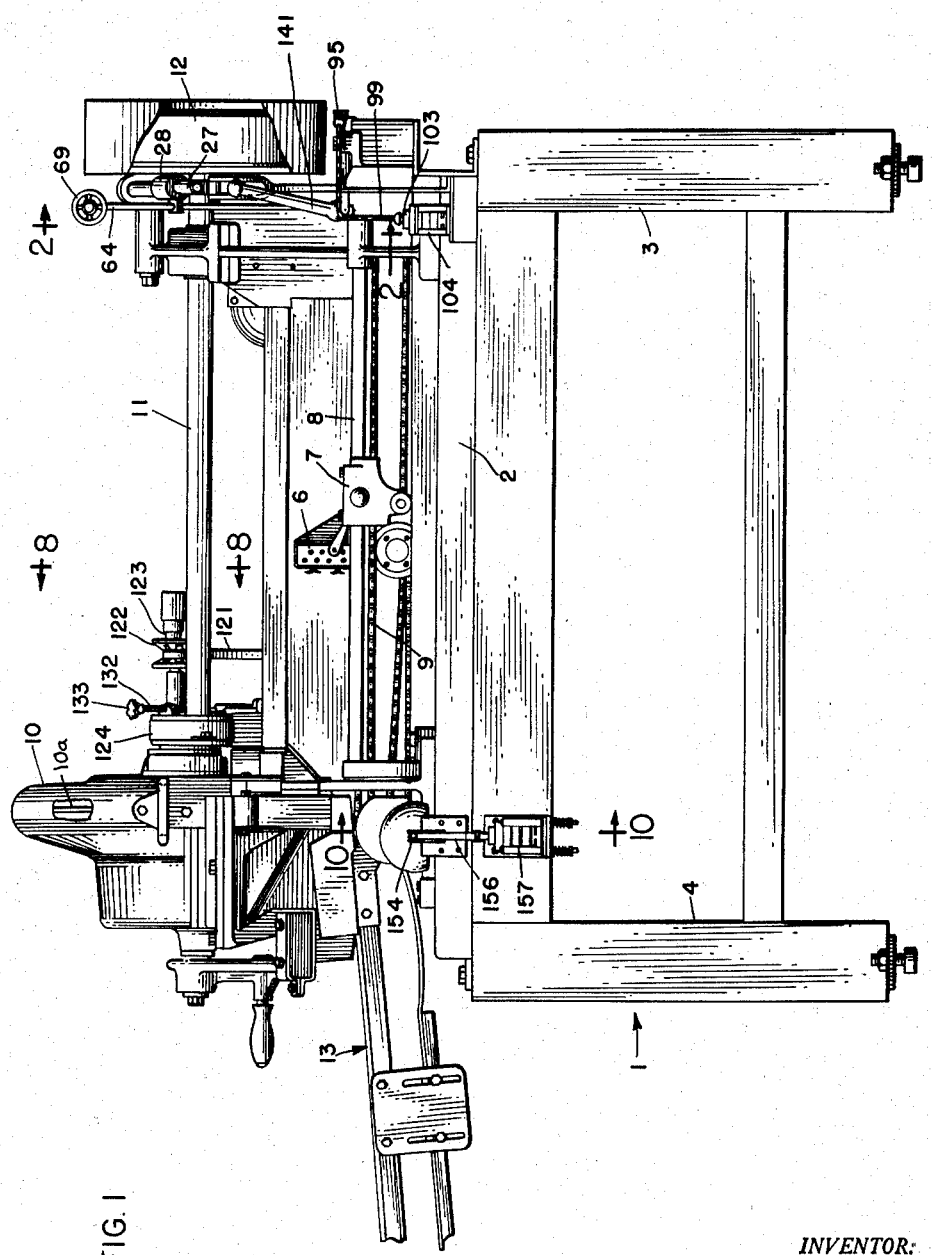
Fig. 1 is a side elevational view of a slicing machine embodying the present invention.

As briefly mentioned hereinabove, the slicing machine embodying the present invention is capable of slicing a substance and either shingling or stacking the slices in spaced groups. When it is desired to shingle the slices, the number of slices which it is desired to be placed in a group must first be determined. For example, if slices amounting to one pound are desired and there are to be, say, 25 slices per pound, then the machine will be set for the conveyor to move continuously and for the substance pusher to be interrupted in its advancement toward the knife for a predetermined period of time after every 25 slices, whereupon a space will occur between the shingled groups of slices. It will have been determined in advance how thick the slices should be in order to provide 25 slices to the pound.

On the other hand, if it is desired to stack slices in groups of, say, 10 slices per stack, then the machine will be set so that the receiving conveyor will remain stationary during the slicing and so that the substance pusher will be interrupted in its advancement toward the knife after every tenth slice. Simultaneously with the interruption of the substance pusher advancement, the conveyor will advance thereby to provide a space on the conveyor for the next group of slices. As soon as the conveyor again stops, the substance pusher will again advance and another group of slices will be stacked. Again the thickness of slices may be regulated, it having been determined in advance the necessary thickness of slices so that the required number will attain the required weight. All of the foregoing operations are accomplished automatically either by mechanical or electrical means as will hereinafter appear. Referring now more particularly to the drawings, and especially to Fig. 1, the numeral 1 indicates generally a supporting structure for the machine consisting primarily by a supporting table top portion 2 supported by legs 3 and 4 at each end thereof.

The substance to be sliced is adapted to be placed on a support 5 (Fig. 8) and to be advanced toward the knife by means of a pusher 6. The pusher 6 may be advanced toward the knife by any suitable means but in the present embodiment of the invention it is illustrated as being connected to an operating member 7 movable longitudinally of the machine on a guide rod 8 and suitably connected to a driving chain 9.

The other main elements of the slicing machine include a rotating cutting knife 10a rotatably mounted within a housing 10 on a main drive shaft 11 extending lengthwise of the machine. The drive shaft 11 is adapted to be driven in any suitable manner such as by means of a pulley or flywheel 12 mounted at the opposite end thereof and connected to any suitable source of driving power.

As the substance pusher 6 advances the substance toward the knife and slices are severed therefrom, they are received by a conveyor 13 preferably, though not necessarily, consisting of a plurality of tapes 14 (Fig. 10) which pass around annular grooves in a drum 15 mounted on a shaft 16 journalled at each end thereof in suitable bearings 17 and 18 at opposite sides of the machine.

The foregoing constitute the main operating parts of the machine and, as will be pointed out in more detail hereinafter, the shaft 16 has a clutch arrangement at one end thereof for engagement when it is desired to move the conveyor and for disengagement when the conveyor is to remain stationary.

*The feed mechanism*

As stated hereinabove the pusher 6 is moved toward the left as viewed in Fig. 1 for advancing the substance toward the knife rotatably mounted within the housing 10. The pusher 6 is associated with the member 7 connected to the chain drive 9 which is caused to move so that the upper run thereof will advance intermittently in rapid succession toward the knife. The mechanism for accomplishing this movement is illustrated in more detail in Figs. 2, 3, 4 and 5 to which reference will now be made.

The main drive shaft 11 is provided adjacent one end thereof and preferably the end nearer the flywheel 12 with an eccentric 19 having a strap 20 surrounding it. The strap 20 has an arm 21 to which a link 22 is connected by means such as the pivot pin 23. The other end of link 22 is rotatably mounted on a stub shaft 24 so that as the main drive shaft 11 rotates the arm 21 will reciprocate in a generally vertical direction and will thereby rock the link 22.

A lug 25 is fixed to or formed integrally with the link 22 and is provided with an opening 26 therethrough for the reception of an elongated rod 27. Thus far it will be evident that a rocking of the link 22 through the movement of eccentric 19 will also impart a rocking movement to the rod 27.

A sleeve member 28 is mounted for sliding movement along the length of rod 27 and is provided with a downwardly extending arm 29 pivotally secured to the bifurcated end 30 of a link 31 by means of a pivot pin 32. The lower end of link 31 is pivotally connected as at 33 to an arm 34 connected with the clutch element 35 having a hub portion 36 (Fig. 4). The element 35 is mounted for rotation on a bearing member 37 on the shaft 38.

The clutch element 35 is provided with a recess in one face thereof thereby providing a radial shoulder portion 39. A cooperating clutch element 40 is also mounted for rotation on the shaft 38 and is received within the recess in the face of element 35 and is adapted to abut at its inner face against the shoulder 39.

A ring 41 is secured to the face of element 35 by means such as the screws 42 thereby holding the elements 35 and 40 together in assembled relation. The upper part of the inner clutch element 40 is provided with a cutaway portion 43 (Fig. 2) within which a roller member 44 is positioned and is urged in a direction to be wedged between the lower face of the cutaway portion 43 and the inner surface of the recess in the face of element 35 by means of a coiled spring 45. This is a relatively common construction in clutches to cause movement of both elements 35 and 40 when the element 35 is caused to rotate in one direction but which permits rotation of element 35 only when it is caused to rotate in the opposite direction.

A hub 46 on the clutch element 40 extends in an axial direction beyond the securing plate 41 and is adapted to receive the clutch face plate 47 which is secured to the hub 46 by means such as set screws 48. The face of the plate 47 has formed thereon a plurality of axially extending projections 49 in circumferentially spaced arrangement between which are located recesses 50 for the reception of lugs 51 in one face of the clutch member 52 mounted for sliding movement axially of the shaft 38.

A brake ring 53 is secured to the face of the plate 47 by means such as the screws 54 and has surrounding it a brake band 55.

The brake band 55 has surrounding it and secured thereto a band 56 containing a loop 57 at one end thereof surrounding and fixed to a rigid bar or stub shaft 58. The opposite end of the outer band 56 is fixed to one end of a rod 59 mounted for longitudinal movement through an opening in a bracket 60 and extends therethrough so that its opposite end may receive shoulder means, such as the nuts 61, in spaced relation to the bracket 60. The brake band 55 is thus held in braking engagement with the ring 53 by yieldable means such as the coiled spring 62 bearing at one end thereof against the shoulder 61 and at its other end against the bracket 60. Thus when the clutch element 35 is caused to rotate in a counterclockwise direction as viewed in Fig. 2 by reason of the upward movement of link 31, it will carry with it the clutch element 40 and the clutch face plate 47 having the lugs and recesses 49 and 50 in one face thereof. This action occurs because the roller 44 is urged into contact between the opposing surfaces of the cutaway part 43 and the inner face of the recess in the element 35. This action is also permitted by the brake band 55 because it will yield by reason of the spring 62.

When, however, the link 31 is caused to move downwardly the brake band 55 will hold the clutch face plate 47 against movement so that only the element 35 will be rotated in a clockwise direction. It will, therefore, be seen that rotation of the main drive shaft 11 will rotate the clutch face plate 47 in predetermined increments intermittently through the medium of the link 31 and the rocking movement of rod 27.

The clutch member 52 is keyed to shaft 38 so that when it is moved toward the right as viewed in Fig. 4 so that the lugs 51 thereon are in engagement with the recesses 50 in the clutch face plate 47, the shaft 38 will rotate each time the link 31 is moved upwardly.

As will presently be seen, the shaft 38 will move the chain 9 to advance the pusher 6 toward the knife a predetermined distance corresponding to the distance through which the clutch element 35 is rotated thereby determining the thickness of each slice to be severed from the substance. The mechanism illustrated in Fig. 2 is also designed to control or regulate the amount of the arc through which clutch element 35 is rotated to thereby regulate the thickness of each slice. This is accomplished in the following manner.

*Mechanism for controlling slice thickness*

As explained above, the sleeve 28 is mounted for sliding movement along the length of rod 27. This sleeve 28, however, has a split arm 63 extending outwardly at one side thereof and has an opening therethrough to receive the rod 64. This rod 64 is movable within the opening in arm 63 so that as rod 27 rocks in a vertical plane, it will not bind against rod 64. The lower end of rod 64 is pivotally secured as at 65 to a part of the machine frame. The upper end of rod 64 passes through an opening in an arm 66 fixed to an internally threaded adjusting member 67. An elongated adjusting rod 68 which is threaded throughout a large portion of its length threadedly engages the opening in the adjusting member 67 and is provided at its outer end with a hand wheel 69 to facilitate rotation thereof. The opposite end of adjusting rod 68 is suitably mounted for rotation in an opening in a supporting member 70 forming a part of the machine frame.

It will be evident that the end of rod 27 nearer shaft 24 will rock through a smaller arc than the end thereof at a distance away from shaft 24. Thus when sleeve 28 is moved along the length of rod 27 to a position farther removed from shaft 24, the point on rod 27 where the sleeve is located will rock through a greater arc and will thereby produce a greater movement of link 31. For example, when sleeve 28 is moved from its full line position in Fig. 2 to the outer end of rod 27 as illustrated by the dot dash lines, the upper and lower positions of rod 27 as it is rocked will be a greater distance apart and, therefore, will induce a greater reciprocating movement of link 31. The greater the reciprocating movement of link 31 the greater will be the arc through which arm 34 and its associated clutch element 35 will be rocked. Each time the clutch element 35 is moved in a counterclockwise direction, as viewed in Fig. 2, a corresponding rotation of shaft 38 will take place. When the adjusting sleeve 28 is nearer the shaft 24 the arc through which shaft 38 will rotate each time will be less.

As will presently be seen, each time shaft 38 is rotated through an arc it will move the pusher member 6 a short distance toward the knife and the distance through which the pusher is moved will determine the thickness of the slice to be served. Thus when adjusting member 28 is at its outermost position along rod 27, a slice of greater thickness will be severed than when the adjusting member 28 is at its innermost position along rod 27.

*The feed control and interrupting mechanism*

Referring again to Figs. 4 and 5 in particular, the shaft 38 is preferably formed to provide a plurality of sections of different diameters and one end thereof is mounted for rotation in a suitable bearing member 71. Another bearing member 72 is provided in one wall of the gear box 73 and the outer end of shaft 38 is then journalled in a bearing 74 positioned in the opposite wall of gear box 73.

It will be understood that when the machine is set to feed a substance toward the knife, the clutch 52 will be in engagement with the clutch disk 47 to provide a positive drive. Intermittent rotation of clutch element 35 will thereupon cause a similar intermittent movement of the clutch 52 and the shaft 38 to which it is keyed.

The shaft 38 is provided with a worm gear section 75 within the gear box 73 which is in mesh with teeth 76 provided on the outer peripheral surface of the outer member 77 of a friction clutch. This clutch element 77 is mounted for rotation adjacent one end of a shaft 78 positioned below shaft 38 and is journalled for rotation in bearings 79 and 80 at opposite sides of the gear box 73.

The other member 81 of the friction clutch assembly is adapted to engage the inner surface of member 77 in complementary fashion as is customary for friction clutches for driving engagement and operation of the shaft 78. The clutch member 81 is provided with a hub portion 82 keyed to the shaft 78 and provided at its outer end with a collar 83 threadedly secured thereto. A coiled compression spring 84 surrounds shaft 78 and bears at one end against the clutch element 81 while its other end abuts a collar 85 positioned against the inner wall of the gear box 73. The spring 84 normally urges member 81 into driving engagement with the member 77 of the friction clutch assembly.

The outer end of shaft 78 extends through the wall of the gear box 73 and has secured thereto a sprocket wheel 86 around which the drive chain 9 is trained. Rotation of the shaft 78, therefore, will rotate sprocket wheel 86 to feed the pusher 6 by reason of its connection with the chain 9.

Thus when the positive drive clutch 52 is moved toward the right, as viewed in Fig. 4, to engage the clutch element 47, it will be caused to rotate shaft 38 intermittently in predetermined increments in accordance with the setting of the adjusting sleeve 28, as above described. The intermittent movement of shaft 38 will be transmitted to shaft 78 through the mechanism described above to thereupon move the pusher 6 and the substance associated therewith in predetermined increments intermittently toward the knife.

As stated previously, the feed of the substance is interrupted after a predetermined number of slices have been severed from the substance in accordance with the mechanism to be described hereinafter. For a present understanding as to the mechanical features of the interrupting mechanism, it will be sufficient to refer to Figs. 5 and 6.

It will be evident that when the friction clutch shown in Fig. 5 is disengaged by movement of the clutch member 81 against the compression of spring 84 the continued rotation of shaft 38 and of clutch element 77 will have no effect upon the drive shaft 78 for the substance pusher. It is merely necessary, therefore, to disengage the friction clutch when it is desired to interrupt the feed. The disengagement of the friction clutch by movement of clutch member 81 is accomplished through the medium of a yoke 87 having the arms thereof extending on opposite sides of shaft 78 and adapted to bear against one face of a bearing member 88. The yoke 87 is secured at one end thereof to a vertically extending pin 89 mounted for a rotative or oscillating movement in a bearing 90. The upper end of pin 89 has secured thereto one end 91 of an arm 92. The arm 92 extends in a substantially horizontal plane and adjacent its outer end is provided with a pair of detents or arcuate recesses 93 and 94.

The spring 84 which normally urges the friction clutch element 81 into engagement with element 77 also urges the yoke 87 toward the left as viewed in Fig. 5. This urging of the yoke will be to the full line position thereof shown in Fig. 6 and through pin 89 will also urge the arm 92 toward the left to its full line position shown in Fig. 6. When arm 92 is moved in a counterclockwise direction, or toward the right to its dotted line position as shown in Fig. 6, it will cause a corresponding movement of yoke 87 to its dotted line position against the force of spring 84 to disengage the elements 81 and 77 of the friction clutch. When the arm 92 is released, the spring 84 will urge the parts to their normal position and again engage the friction clutch for advancing the pusher.

Movement of arm 92 for engaging and disengaging the clutch is accomplished by means of a lever arm 95 pivotally mounted at 96 on the machine frame. The lever arm 95 is in the nature of a bell crank with the other arm thereof as shown at 97 provided with a roller 98 at the outer end thereof adapted to seat in one or the other of the recesses 93 or 94 in arm 92. Thus, when lever arm 95 is moved toward the left, as viewed in Fig. 6, the other arm 97 thereof with its roller 98 will also be moved in a clockwise direction to urge the arm 92 toward the right. This movement may continue until roller 98 is seated in recess 94 at which point arm 92 will have been moved to its dotted line position to disengage the friction clutch heretofore described.

Electrical means have been provided to automatically move arm 95 to disengage the friction clutch momentarily after a predetermined number of slices have been severed from the substance. Such means include a chain 99 or other suitable fastening means having one end thereof secured in any suitable manner such as by means of a bolt 100 to the outer end of lever arm 95. Chain 99 is then trained around a sprocket wheel 101 mounted on a suitable support 102 and is secured at its opposite end by any suitable means to the core 103 of a solenoid 104.

Each time the solenoid 104 is energized to draw the core 103 inwardly or downwardly, it will pull the chain 99 and will operate lever arm 95 to disengage the friction clutch elements 81 and 77 thereby interrupting the feeding of the substance toward the knife.

The solenoid 104 is connected in an electric circuit which also includes a switch 105 (Fig. 9) consisting of the two blades 106 and 107 each having contact members thereon. The switch 105 is normally open, but, when closed, will close the circuit to the solenoid 104 to energize the same and cause an interruption in the operation of the feed mechanism. One of the blades 107 on the switch 105 has a projection 108 thereon adapted to be periodically contacted by means of a suitable lug 109 mounted on the periphery of a wheel or disk 110. This disk 110 is secured to the outer end of a shaft 111 (Fig. 10).

For a more clear understanding relative to the drive means for shaft 111 and the means for regulating the time interval between each interruption of the feed mechanism, reference will now be made more particularly to Figs. 8 and 9.

Shaft 111 has keyed thereto a sprocket wheel 112 around which a chain 113 is trained. This chain 113 is also trained around another sprocket wheel 114 mounted on shaft 115 at the rear of the machine and is journalled for rotation in suitable bearings in the walls of the housing 116. Shaft 115 also has mounted thereon a gear 117 meshing with a worm gear 118 on shaft 119 also mounted for rotation in the housing 116. One end of shaft 119 extends beyond the housing and has a pulley 120 secured thereto.

A drive belt 121 passes around pulley 120 and around a variable speed pulley 122 mounted on shaft 123. The variable speed pulley 122 is a commercially available item and its construction is well-known so that it is sufficient to point out here that it comprises the two cone shaped disks as shown which are spring loaded so that they are normally urged toward each other. When the pulley 122 is moved downwardly or closer to pulley 120 the two cone shaped disks will move toward each other thereby enlarging the effective diameter of the pulley around which the belt 121 is trained. Likewise, if the pulley 122 is elevated so as to be a greater distance away from pulley 120 the disks thereof will be moved farther apart so that the effective diameter thereof is decreased.

Shaft 123 on which the variable speed pulley 122 is mounted is journalled for rotation in suitable bearings within a housing 124. Within the housing 124 the shaft 123 is provided with a pulley 125 around which a belt 126 passes and is driven by a pulley 127 also within the housing and mounted on the main drive shaft 11. It is thus evident that the main drive shaft 11 will drive shaft 111 by means of the belts 126 and 121 which drive the chain 113.

As stated above, each rotation of shaft 111 will cause the lug 109 on wheel 110 to contact or wipe against the portion 108 of switch arm 107 thereby to close the switch and energize the solenoid 104. When this occurs, the clutch elements 81 and 77 will be disengaged and movement of the pusher 6 toward the knife will be momentarily interrupted. As soon as lug 109 permits the switch 105 to open, the solenoid 104 will be de-energized whereupon the friction clutch will again be engaged and cause intermittent advancement of the substance toward the knife as hereinabove explained.

It will be obvious that the main drive shaft 11 rotates at a constant speed to advance the substance pusher toward the knife at a constant intermittent rate. The greater the speed of rotation of shaft 111 and wheel 110 the more often will the feed be interrupted resulting in fewer slices in each group. If the rotation of wheel 110 is at a slower rate, then the lug 109 will close the switch 105 less often so that the spaces between the groups of slices will occur less frequently resulting in a greater number of slices in each group. The frequency of occurrence of the feed interruptions resulting in the spaces between the groups is determined by the position of the variable speed pulley 122. When pulley 122 is adjusted to have a smaller effective diameter, then the rotation of wheel 110 and shaft 111 will be at a slower rate thereby producing interruptions of the feed less frequent and resulting also in a greater number of slices in each group. When, however, the variable speed pulley 122 is adjusted so that its effective diameter is greater, then the speed of rotation of wheel 110 will be increased and the interruptions will thereby be more frequent resulting in a fewer number of slices in each group.

The adjustment of the variable speed pulley 122 toward and away from the pulley 120 to vary the effective diameter thereof is accomplished manually by the mechanism more clearly illustrated in Fig. 8.

A bracket 128 mounted on the machine frame has an arcuate slot 129 located therein through which a retaining bolt 130 passes and threadedly engages an opening in the side of the housing 124. The housing 124 and shaft 123 together with the pulleys 125 and 122 thereon may be bodily adjusted toward and away from pulley 120 about shaft 11 as a center. The entire assembly may then be retained in adjusted position by the bolt 130. An ear 131 is formed on the housing 124 and has an internally threaded opening therethrough to receive a threaded rod 132. The lower end of this rod 132 rests against the upper part of the bracket 128 and is provided at its upper end with a hand wheel 133 whereby the rod may be rotated.

Thus when the retaining bolt 130 is loosened, the rod 132 may be rotated by grasping the hand wheel 133 to raise or lower the housing 124 and variable speed pulley 122 and thereafter tightening the bolt 130 will retain the entire assembly in its adjusted position.

The foregoing adjusting means is necessary in a machine of this character to adjust or regulate the number of slices in a group. The substance to be sliced, such as bacon, may vary considerably in size and shape and it is first determined as to what thickness of slice is desired. As explained above, the mechanism illustrated in Fig. 2 is adjusted so that the substance pusher will be advanced intermittently an amount equal to the slice thickness desired. From this it may be determined how many slices are necessary for a given weight. If it is determined, for example, that pound packages are desired and that 25 slices of a given thickness will weigh one pound, then the mechanism illustrated in Fig. 8 will be adjusted so that the wheel 110 will make one revolution for each 25 revolutions of the main drive shaft 11 on which the slicing knife is mounted. Thus after each 25th slice the switch 105 will be closed momentarily while the conveyor continues to move whereupon the solenoid 104 will be energized to interrupt the feed of the substance toward the knife for perhaps three or four revolutions of the main drive shaft 11 during which time no slices will be severed thereby creating a space between the groups of slices.

If the slices are to be made thicker, then the mechanism of Fig. 2 will be adjusted to regulate the desired thickness and the mechanism of Fig. 8 will be adjusted to rotate the wheel 110 at a greater speed so that the spaces will occur more often resulting in fewer slices in each group.

The foregoing operation takes place whether the slices are to be shingled, as shown in Fig. 11, or stacked, as shown in Fig. 12, the primary difference between shingling and stacking being that during the shingling of slices the receiving conveyor will move continuously, whereas, in the stacking of slices, the receiving conveyor will be stationary during the slicing operation and feeding of the substance toward the knife and will move only during the period that the substance feed is interrupted.

The reversing mechanism

It is customary in slicing machines of this character to provide means for automatically returning the substance pusher 6 to its original starting position as soon as the substance being sliced has been cut to a minimum amount. This may be done in several ways one of which may be to change the connection of member 7 from the upper to the lower run of the feed chain 9 permitting the chain to continue to move in the same direction while another way is to reverse the direction of movement of the chain itself. For purposes of illustration, the reversing mechanism shown herein carries out the latter method where the chain 9 reverses its direction of movement.

In describing the reversing mechanism, reference will be made to Fig. 4 of the drawings wherein a clutch element 134 in the form of a sprocket wheel having teeth 135 thereon is rotatably mounted adjacent one end of the shaft 38 at the right-hand end of the machine as viewed in Fig. 1. The inner face of the clutch element 134 is similar to clutch element 47 and has a plurality of circumferentially spaced axially extending lugs 136 having spaces therebetween adapted to receive the axial projections 137 on the opposite face of clutch 52.

Clutch element 134 has chain 138 trained therearound which chain 138 is also trained around a similar sprocket wheel (not shown) mounted directly on the main drive shaft 11. Thus the sprocket wheel or clutch element 134 rotates constantly in a direction which, when connected with shaft 38 would drive the feed chain 9 so that the upper run thereof moves toward the right, as viewed in Fig 1, to return the pusher 6 to its original position. Since the element 134 is freely rotatable on shaft 38, it will not cause rotation of the shaft until engaged by the intermediate clutch element 52 which, as previously stated, has a keyed connection to the shaft 38.

This intermediate clutch member 52 has an annular groove 139 adapted to receive the bifurcated ends 140 of an arm connected to the lever arm 141. This lever arm 141 is pivotally mounted on the machine frame by a pivot pin 142 and extends upwardly so that it may be moved to shift the intermediate clutch member 52 either toward the right for feeding the substance to the knife, or toward the left for returning the substance pusher back to its original position.

The conveyor operating mechanism

It has been made clear heretofore that for shingling, the receiving conveyor 13 moves continuously and only the substance feeding mechanism is interrupted for spacing the groups of slices. For stacking, the conveyor 13 is stationary during the slicing of the substance but is caused to move only during the time that the feeding of the substance toward the knife is interrupted. The means by which this may be accomplished is illustrated more clearly in Fig. 10.

The shaft 16 on which the drum 15 is mounted for driving the tapes 14 of the conveyor 13 is provided at one end thereof with a positive drive clutch element 143 of well-known construction. A similar and complementary clutch element 144 is mounted on the inner end of shaft 111. This shaft 111 is mounted for axial sliding movement and, as explained hereinabove, is driven by the main shaft 11 through the mechanism shown in Fig. 9. It will be evident, therefore, that when shaft 111 is moved inwardly of the machine so that its clutch element 144 is in engagement with clutch element 143 on the conveyor drive shaft 16, the conveyor 13 will be moved during the time that such clutch elements are in engagement. When these clutch elements are caused to be disengaged, all movement of the conveyor 13 will stop.

Shaft 111 has an elongated keyway 145 therein, whereby the sprocket wheel 112 and its associated key has a driving connection therewith. The keyway 145 is made sufficiently long to permit axial shifting of the shaft 111 and still retain the driving engagement of the sprocket 112 therewith.

An annular groove 146 is provided adjacent the outer end of shaft 111 within which is received a bifurcated end of an upstanding arm 147. This arm 147 is rigidly connected to a bar or shaft 148 mounted for longitudinal movement in the machine frame. A collar 149 is positioned at a suitable location on the shaft 148 and a coiled compression spring 150 surrounding the shaft 148 bears at one end against the collar 149 and at its other end against a stationary part of the machine. The spring 150, therefore, will urge shaft 148 toward the left, as viewed in Fig. 10, so that the clutch elements 143 and 144 will be normally disengaged to prevent movement of the conveyor 13.

Shifting of the shaft 148 toward the right to cause engagement of the clutch elements and movement of the conveyor is accomplished by energizing a solenoid which mechanically moves the shaft 148 through the medium of a bell crank lever 151. This bell crank lever 151 is pivotally mounted as at 152 on a bracket 153 on the machine frame. One arm 154 of the bell crank is secured to an end of the shaft 148 and the other arm 155 of the bell crank is connected with the armature or core 156 of the solenoid 157.

Thus, when the solenoid 157 is energized to cause the core 156 thereof to move downwardly, the result will be to shift the shaft 148 toward the right and engage the clutch element 143 and 144 to drive the conveyor 13. During the shingling of the slices the solenoid 157 is constantly energized to maintain the clutch elements 143 and 144 in engagement so that the conveyor will move continuously. The electrical circuit is such, however, that for the stacking of slices the solenoid 157 will be normally de-energized but will be caused to be energized simultaneously with the solenoid 104 when the switch 105 is closed. Thus, energizing solenoid 104 will interrupt the feeding of the substance toward the knife at the same time that the energization of solenoid 157 will cause movement of the conveyor 13.

A manual switch 158 is positioned in the circuit so that when this switch is closed the solenoid will be energized and will remain energized. When, however, the switch 158 is manually opened the solenoid 157 will be normally de-energized and will become energized only upon the closing of switch 105.

To illustrate this point more clearly, reference will now be made to the wiring diagram of Fig. 13 where it will be seen that a source of power is indicated by the two lines 159 and 160. These two lines are connected directly with the solenoid 104. The switch 105, however, is in one side of the line so that upon closing the switch 105, the solenoid 104 will become energized to interrupt the feed of the substance toward the knife. This switch 105, as noted in Fig. 9, will be closed momentarily upon each revolution of shaft 111 and wheel 110 due to the lug 109 thereon.

The solenoid 157 is also connected across the two lines 159 and 160 by means of the connections 161 and 162. This main line, however, has a normally open switch 163 therein which may be caused to be closed in any suitable manner when the solenoid 104 is energized. The closing of switch 163 will complete the circuit to energize the solenoid 157.

The manually operable switch 158 is in parallel with switch 163 so that when switch 158 is manually closed the circuit will be completed to energize the solenoid 157 for continuous movement of the conveyor. It will thus make no difference whether switch 163 is closed or open. When switch 158 is manually closed the solenoid 157 will be continuously energized for constant movement of the conveyor so that the closing of switch 105 by lug 109 will operate solenoid 104 only to interrupt the substance feed at predetermined intervals. When, however, it is desired to stack the slices, as shown in Fig. 12, the manual switch 158 will remain open so that when switch 105 is closed by lug 109 the solenoid 104 will be energized to stop the substance feed which will thereupon close switch 163 to energize the solenoid 157 and cause movement of the conveyor simultaneously with the stopping of the feed. When the solenoid 157 is de-energized either by the opening of switch 158 or switch 163, the spring 150 will immediately cause disengagement of the clutch elements 143 and 144.

The modified slice thickness adjustment

Fig. 14 illustrates a modification of the slice thickness adjustment from that heretofore described and illustrated in Fig. 2. In Fig. 14 identical parts are referred to by the same reference numbers and in this modified form the main drive shaft 11 operates the eccentric 19 to oscillate the link 22 and its connected integral member 25 which supports the oscillating tube. In Fig. 2 this oscillating tube is identified by the numeral 27, whereas in Fig. 14 the tube has been modified and is identified by the numeral 164.

A sleeve 165 having a downwardly projecting arm 166 thereon is connected with the link 31. Thus, when the drive shaft 11 operates to oscillate the rod 164 the oscillation thus imparted to sleeve 165 will be transmitted to link 31 as heretofore described to rotate shaft 38 in a step-by-step movement. This movement of shaft 38 will be transmitted to shaft 78 through the medium of the worm gear 75 and the gear 76 thereby to advance the substance pusher 6 toward the knife in a step-by-step movement.

Instead of controlling the step-by-step movement of the substance pusher by rotation of the threaded shaft 68, as shown in Fig. 2, to move the sleeve 28, along the length of rod 27, a modified means has been devised for moving the sleeve 165 in Fig. 14 along the length of rod 164.

The tubular rod 164 is provided with opposed elongated slots 167 extending lengthwise thereof. A rod 168 is rotatably mounted within the tubular member 164 and is caused to rotate by the use of a flexible shaft 169 having connection therewith by the customary interlocking means 170. Thus, rotation of the flexible shaft 169 from any suitable source such as a small motor (not shown) will thereupon cause rotation of the rod 168.

The rod 168 is provided with threads throughout a portion of its length and an inner sleeve member 171 has an opening therethrough whereby it has a threaded connection with the rod 168.

The inner ends 172 of screws 173 extending inwardly on opposite sides of the tubular member 164 pass through the slots 167 and into suitable openings in the wall of sleeve 171. When the rod 168 is rotated and the inner sleeve is thus held against rotation therewith, this inner sleeve 171 will be caused to move lengthwise of the tubular member 164 due to its threaded connection with rod 168. Since the screws 173 also pass through the outer sleeve 165, the axial movement of the inner sleeve 171 will carry the outer sleeve 165 with it and will thereupon move it lengthwise of the tubular member 164.

As explained previously, the location of the outer sleeve 165 along the length of the tubular rod 164 will determine the amount of throw imparted to link 31 which also determines the distance through which the pusher 6 will be advanced in its step-by-step movement toward the knife. This form of the invention has been determined to facilitate the adjustment of the slice thickness and, if desired, a suitable dial or other indicating mechanism can be provided to give a direct reading of the slice thickness at any given position of the sleeve 165 along the tubular member 164. When the slice thickness is to be altered for the next type of substance to be sliced, it is necessary merely to put into operation the means used to rotate the flexible shaft 169 to move the sleeve 165 and when the desired thickness reading is reached, the motive means for the flexible shaft may be stopped.

*The electrical control for grouping slices*

Figs. 16 and 17 illustrate a modified control mechanism for causing a space to occur on the conveyor after a predetermined number of slices have been severed for the purpose of grouping the slices. This modified form is completely electrical as compared with the mechanism of Figs. 8 and 9 wherein the electrical means for causing an interruption in the feeding device is controlled mechanically. It was pointed out in connection with Figs. 8 and 9 that each time switch 105 is closed by the lug 109, an interruption in the feed would take place. The interval between these interruptions was controlled by the effective diameter of the variable speed pulley 122.

The modification of Figs. 16 and 17 involves a completely electrical control and a monitor or counting device which automatically records and counts the number of slices severed and automatically causes an interruption in the feed after a predetermined number of slices have been severed.

A mechanical counting device 174 may be mounted on any suitable part of the machine frame and is provided with an arm 175 adapted to send out an electrical impulse each time the arm 175 is moved. The registering of the number of slices is mechanically accomplished by means of a commercially available counting device 174 and the arm 175 is adapted to be moved upon each revolution of the main drive shaft 11 through the medium of a cam 176 mounted thereon. Since a slice will be severed by the knife upon each rotation of shaft 11, the cam 176 will contact arm 175 to record the number of slices in the registering device 174. These elements 174, 175 and 176 are all illustrated diagrammatically in the wiring diagram of Fig. 17. It is sufficient for present purposes to state that movement of arm 175 will not only mechanically register the number of slices severed, but will also close a circuit within the box 174 upon each movement of the arm which will thereupon create an electrical impulse in the monitor or electronic counter 177.

This monitor is a relatively complicated electric device and is commercially available to be adapted for use in various kinds of counting operations, and may be obtained from Production Instrument Company, Chicago, Illinois, as Model SP–D6–99. The monitor 177 includes any desired number of electrically operated ratchet mechanisms adapted to record the number of electrical impulses occurring by reason of the movement of the switch arm 175. Since the construction and operation of the monitor or counting device is well known, and since such devices are commercially available, it is unnecessary to give a detailed description thereof herein since the monitor itself forms no part of the present invention apart from its specific application in the circuit adapting it for use to count the number of slices in a slicing machine.

It is sufficient to state here that the monitor is provided with a number of dials such as the dials 178 and 179 divided into units and tens, respectively. These dials may be set for any number of electrical impulses so that after a predetermined number of impulses have been recorded, a circuit will be closed to energize solenoids also in the circuit. Dial 180 on the monitor may be adjusted to control the period of time that the solenoids remain energized.

In the particular application of the monitor to the present invention, it is sufficient to note, as illustrated in Fig. 17, that the mechanical counter 174 is electrically connected to the monitor so that each time the cam 176 moves the switch arm 175 a switch will be closed to create an electrical impulse recorded by the mechanism within the monitor 177. If it is desired to close the electrical circuit through the solenoids after every 25 slices have been severed, the dials 178 and 179 may be set to the number 25. After 25 slices have been severed, which will have caused 25 electrical impulses to be recorded within the monitor, a circuit will be closed through the main power lines 181 and 182 to energize the solenoid 104. If the manual switch 158 is open, then the operation of solenoid 104 will close switch 163 and close the circuit through solenoid 157 in the same manner as heretofore described with respect to Fig. 13.

The actual operation of the machine and of the means for controlling the shingling and stacking of the slices will be the same as that heretofore described in connection with Figs. 1 to 13, inclusive. If, for example, it is desired to shingle the slices, as shown in Fig. 11, the switch 158 in Fig. 17 will be manually closed to maintain the solenoid 157 constantly energized thereby moving the conveyor continuously by engaging the clutch elements 143 and 144, as shown in Fig. 10. Instead of regulating the effective diameter of the variable speed pulley, however, the machine operator will set the dials 178 and 179 to the desired number of slices for each group whereupon the severing of each slice will record an electrical impulse in the monitor 177 until the require number of slices have been severed whereupon the solenoid 104 will be energized to interrupt the feeding of the substance toward the knife, all as explained hereinabove.

When it is desired to stack the slices, as shown in Fig. 12, then the manual switch 158 will be opened to disengage the clutch elements 143 and 144 so that the conveyor will remain stationary during the time that the slices are being severed. When the required number of electrical impulses have been recorded in the monitor in accordance with the number of slices severed, then the electrical circuit will be closed to energize the solenoid 104 and interrupt the feed while simultaneously closing switch 163 to complete the circuit through and energize the solenoid 157 to move the conveyor and provide the necessary space between the stacks.

Either the mechanical method of regulating the slice thickness, as shown in Fig. 9, or the electrical apparatus for accomplishing the same purpose, as shown in Figs.

16 and 17, results in a satisfactory automatic operation of the machine.

From the foregoing it will be evident that any number of slices of any desired thickness may be shingled or stacked by the machine embodying the invention herein. The machine is thus capable of universal application to many different types of substances and whether the slices are to be shingled or stacked once it is determined the weight of the package to be formed in groups and the number of slices required for a given thickness of slice, it is a simple matter to adjust the various controls and start the machine whereupon the shingling or stacking will be automatic as well as the spacing between the groups thereby dispensing with the time consuming operation of weighing individual groups and adding or taking away slices therefrom to obtain accurate weight.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A slicing machine of the class described comprising a knife, a pusher for feeding a substance to the knife to be sliced thereby, a conveyor for receiving slices of the substance and for carrying the slices away from the machine, means to drive the conveyor, reciprocating drive means for advancing said pusher toward said knife in a step-by-step movement, means for arranging the severed slices into groups onto said conveyor, each group containing a predetermined number of slices including a first control means having adjustable mechanism for predetermining the number of slices for each group and a second control means, mechanism responsively connecting said second control means with said first control means, said second control means having mechanism for interrupting the advancement of said pusher after each time said predetermined number of slices has been severed, and means operatively connected to said second control means for selectively rendering said conveyor drive means operative to drive said conveyor continuously for shingling the slices and for rendering said conveyor drive means operative to drive said conveyor only when advancement of the pusher is interrupted from stacking said slices, thereby to space the groups along said conveyor.

2. A slicing machine of the class described comprising a knife, a pusher for feeding a substance to the knife to be sliced thereby, a conveyor for receiving slices of the substance and for carrying the slices away from the machine, means to drive the conveyor, drive means for advancing said pusher toward said knife in a step-by-step movement, adjusting means for regulating the distance of each step-by-step movement of said pusher for establishing slice thickness, means for arranging the severed slices on the conveyor into groups each containing a predetermined number of slices including a means having mechanism adjustable for predetermining the number of slices for each group and a control means for interrupting the advancement of said pusher, means for actuating the control means by the adjustable number determining means after each time said predetermined number of slices has been severed, and means operatively connected to said second control means for selectively rendering said conveyor drive means operative to drive said conveyor continuously for shingling the slices and for rendering said conveyor drive means operative to drive said conveyor only when advancement of the pusher is interrupted for stacking said slices, thereby to space the groups along said conveyor.

3. A slicing machine capable of shingling or stacking slices severed from a substance, comprising a knife, a pusher for feeding a substance to the knife to be sliced thereby, drive means for advancing said pusher toward the knife, a conveyor for receiving slices of the substance, drive means for said conveyor, and solenoid actuated means for selectively rendering said drive means operative to drive said conveyor continuously for shingling the slices and for rendering said drive means operative to drive said conveyor only at predetermined intervals for stacking the slices.

4. A slicing machine capable of shingling or stacking slices severed from a substance, comprising a knife, a pusher for feeding a substance to the knife to be sliced thereby, drive means for advancing said pusher toward the knife, a conveyor for receiving slices of the substance, drive means for said conveyor, clutch means for connecting said drive means in driving engagement with said conveyor, solenoid actuated means for maintaining said clutch means engaged to drive said conveyor continuously for shingling the slices, and electric switch means for operating said solenoid actuated means for engaging said clutch only at predetermined intervals for stacking the slices.

5. A slicing machine capable of shingling or stacking slices severed from a substance, comprising a knife, a pusher for feeding a substance to the knife to be sliced thereby, a conveyor for receiving slices of the substance, means for advancing said pusher toward said knife, means for interrupting the advancement of said pusher after a predetermined number of slices have been severed for grouping the slices, drive means for said conveyor, and solenoid actuated means for selectively rendering said drive means operative to drive said conveyor continuously for shingling the slices and for rendering said drive means operative to drive said conveyor only during the interruption of the advancement of said pusher for stacking the slices.

6. A slicing machine capable of shingling or stacking slices severed from a substance, comprising a knife, a pusher for feeding a substance to the knife to be sliced thereby, a conveyor for receiving slices of the substance, means for advancing said pusher toward said knife, means for interrupting the advancement of said pusher after a predetermined number of slices have been severed for grouping the slices, drive means for said conveyor, clutch means for connecting said drive means with said conveyor, solenoid actuated means for maintaining said clutch means engaged to drive said conveyor continuously for shingling the slices, and electric switch means for operating said solenoid actuated means for engaging said clutch only during the interruption of the advancement of said pusher for stacking the slices.

7. A slicing machine capable of shingling or stacking slices severed from a substance, comprising a knife, a pusher for feeding a substance to the knife to be sliced thereby, a conveyor for receiving slices of the substance, means for advancing said pusher toward said knife in a step-by-step movement, means for adjusting the distance of each step-by-step movement of said pusher for controlling slice thickness, means for interrupting the advancement of said pusher after a predetermined number of slices have been severed for grouping the slices, drive means for said conveyor, clutch means for connecting said drive means with said conveyor, solenoid actuated means for maintaining said clutch means engaged to drive said conveyor continuously for shingling, and electric switch means for operating said solenoid actuated means for engaging said clutch means only during the interruption of the advance of said pusher for stacking the slices.

8. A slicing machine of the class described comprising a knife, a pusher for feeding a substance to the knife to be sliced thereby, a conveyor for receiving slices of the substance and for carrying the slices away from the machine, drive means for advancing said pusher toward said knife, means for grouping the severed slices into groups each containing a predetermined number of slices including a first control means for predetermining the number of slices for each group and a second control means operatively associated with said first control means for interrupting the advancement of said pusher after each time said predetermined number of slices has been severed, thereby to space the groups along said conveyor, drive means for said conveyor, clutch means for rendering said last named drive means operative or inoperative, said second control means also adapted to operate said clutch means when said conveyor drive means is inoperative, thereby to render said conveyor drive means operative for stacking the slices.

9. A slicing machine of the class described comprising a knife, a pusher for feeding a substance to the knife to be sliced thereby, a conveyor for receiving slices of the substance and for carrying the slices away from the machine, drive means for advancing said pusher toward said knife in a step-by-step movement, means for grouping the severed slices into groups each containing a predetermined number of slices including a first control means for predetermining the number of slices for each group and a second control means operatively associated with said first control means for interrupting the advancement of said pusher after each time said predetermined number of slices has been severed, thereby to space the groups along said conveyor, drive means for said conveyor, clutch means for rendering said last named drive means operative or inoperative, said second control means also adapted to operate said clutch means when said conveyor drive means is inoperative, thereby to render said conveyor drive means operative for stacking the slices.

10. A slicing machine capable of shingling or stacking slices severed from a substance, comprising a knife, a pusher for feeding a substance to the knife to be sliced thereby, a conveyor for receiving slices of the substance, means for advancing said pusher toward said knife, electrical means for interrupting the advancement of said pusher at predetermined intervals thereby to group the slices into groups of a predetermined number of slices, means operatively associated with said electrical means for preselecting the number of slices for each group, means for driving said conveyor continuously, whereby the slices of each group will be shingled, alternative means adapted to render the conveyor drive means normally inoperative when it is desired to stack the slices, and means, operable simultaneously with the operation of said electrical means and when the conveyor drive means is inoperative, for rendering the conveyor drive means operative only during the interruption of the advancement of the pusher, whereby to space the stacked slices along the conveyor.

11. A slicing machine capable of shingling or stacking slices severed from a substance, comprising a knife, a pusher for feeding a substance to the knife to be sliced thereby, a conveyor for receiving slices of the substance, means for advancing said pusher toward said knife, electrical means for interrupting the advancement of said pusher at predetermined intervals thereby to group the slices into groups of a predetermined number of slices, presettable mechanical means operatively associated with said electrical means for preselecting the number of slices for each group, means for driving said conveyor continuously, whereby the slices of each group will be shingled, alternative means adapted to render the conveyor drive means normally inoperative when it is desired to stack the slices, and means, operable simultaneously with the operation of said electrical means and when the conveyor drive means is inoperative, for rendering the conveyor drive means operative only during the interruption of the advancement of the pusher, whereby to space the stacked slices along the conveyor.

12. A slicing machine capable of shingling or stacking slices severed from a substance, comprising a knife, a pusher for feeding a substance to the knife to be sliced thereby, a conveyor for receiving slices of the substance, means for advancing said pusher toward said knife, electrical means for interrupting the advancement of said pusher at predetermined intervals thereby to group the slices into groups of a predetermined number of slices, electric selective means operatively associated with said electrical means for preselecting the number of slices for each group, means for driving said conveyor continuously, whereby the slices of each group will be shingled, alternative means adapted to render the conveyor drive means normally inoperative when it is desired to stack the slices, and means, operable simultaneously with the operation of said electrical means and when the conveyor drive means is inoperative, for rendering the conveyor drive means operative only during the interruption of the advancement of the pusher, whereby to space the stacked slices along the conveyor.

13. A slicing machine capable of shingling or stacking slices severed from a substance, comprising a knife, a pusher for feeding a substance to the knife to be sliced thereby, a conveyor for receiving slices of the substance, means for advancing said pusher toward said knife, electrical means for interrupting the advancement of said pusher at predetermined intervals thereby to group the slices into groups of a predetermined number of slices, electric selective means operatively associated with said electrical means for preselecting the number of slices for each group, means for driving said conveyor continuously, whereby the slices of each group will be shingled, alternatively operable electric switch means adapted to render the conveyor drive means normally inoperative when it is desired to stack the slices, and other electrical means actuated by the operation of said first electrical means when the conveyor drive means is inoperative, for rendering the conveyor drive means operative only during the interruption of the advancement of the pusher, whereby to space the stacked slices along the conveyor.

14. A slicing machine of the class described comprising a knife, a pusher for feeding a substance to the knife to be sliced thereby, a normally stationary conveyor for receiving and stacking slices of the substance, drive means for advancing said pusher toward said knife, solenoid actuated means for interrupting the advancement of said pusher toward the knife at predetermined intervals, thereby to group the slices, solenoid actuated means operable during each interruption of the advancement of said pusher to drive said conveyor, thereby to space the stacked groups of slices along said conveyor, and switch means to operate both of said solenoid actuated means simultaneously.

15. A slicing machine of the class described comprising a knife, a pusher for feeding a substance to the knife to be sliced thereby, a normally stationary conveyor for receiving and stacking slices of the substance, drive means for advancing said pusher toward said knife, electrical means for interrupting the advancement of said pusher toward the knife at predetermined intervals, thereby to group the slices, means operatively associated with said electrical means for preselecting the number of slices to be severed between said intervals, and solenoid operated means actuated by the operation of said electrical means for driving said conveyor during each interruption of the advancement of said pusher, thereby to space the stacked groups of slices along said conveyor.

16. A slicing machine of the class described comprising a knife, a pusher for feeding a substance to the knife to be sliced thereby, a normally stationary conveyor for receiving and stacking slices of the substance, drive means for advancing the pusher toward said knife, means for grouping the slices into a plurality of spaced stacks each containing a predetermined number of slices, including a first electrical control means for preselecting the number of slices in each group, a second electrical control means actuated by the operation of said first control means to interrupt the advancement of said pusher toward the knife after each preselected number of slices has been severed, and a third electrical control means actuated by the operation of said second control means for driving said conveyor during each interruption of the advancement of said pusher, thereby to space the stacked groups of slices along said conveyor.

References Cited in the file of this patent

UNITED STATES PATENTS

| | | |
|---|---|---|
| 1,310,262 | Van Berkel | July 15, 1919 |
| 1,976,824 | Ahrndt | Oct. 16, 1934 |
| 2,047,399 | Walter | July 14, 1936 |
| 2,168,612 | Ahrndt | Aug. 8, 1939 |
| 2,239,665 | Straeten | Apr. 22, 1941 |
| 2,426,835 | Mahler | Sept. 2, 1947 |
| 2,744,553 | Folk | May 8, 1956 |